(12) United States Patent
Leoncavallo et al.

(10) Patent No.: US 9,952,065 B2
(45) Date of Patent: Apr. 24, 2018

(54) POSITION SENSOR DEVICE TO DETERMINE A POSITION OF A MOVING DEVICE

(71) Applicant: ams AG, Unterpremstaetten (AT)

(72) Inventors: Ruggero Leoncavallo, Gratkorn (AT); Kurt Riedmueller, Unterpremstaetten (AT)

(73) Assignee: AMS AG, Unterpremstaetten (AT)

( * ) Notice: Subject to any disclaimer, the term of this patent is extended or adjusted under 35 U.S.C. 154(b) by 55 days.

(21) Appl. No.: 14/911,023

(22) PCT Filed: Jul. 30, 2014

(86) PCT No.: PCT/EP2014/066381
§ 371 (c)(1),
(2) Date: Feb. 8, 2016

(87) PCT Pub. No.: WO2015/018713
PCT Pub. Date: Feb. 12, 2015

(65) Prior Publication Data
US 2016/0202089 A1 Jul. 14, 2016

(30) Foreign Application Priority Data

Aug. 9, 2013 (EP) .................................... 13179900

(51) Int. Cl.
*G01D 5/24* (2006.01)
*G01D 5/244* (2006.01)
(52) U.S. Cl.
CPC ..... *G01D 5/24476* (2013.01); *G01D 5/24495* (2013.01)

(58) Field of Classification Search
CPC .................... G01D 5/24476; G01D 5/24495
See application file for complete search history.

(56) References Cited

U.S. PATENT DOCUMENTS

| 4,837,492 | A | 6/1989 | Kurosawa et al. |
| 5,721,546 | A | 2/1998 | Tsutsumishita |
| (Continued) |

FOREIGN PATENT DOCUMENTS

| CN | 1135038 A | 11/1996 |
| CN | 101253391 A | 8/2008 |
| (Continued) |

*Primary Examiner* — Julian Huffman
*Assistant Examiner* — Michael Konczal
(74) *Attorney, Agent, or Firm* — McDermott Will & Emery LLP

(57) ABSTRACT

A position sensor device to determine a position of a moving device comprises a detection unit to detect a signal generated by the moving device and an evaluation unit to determine a first position ($\alpha 0_{(t1)}$) specifying the position of the moving device at a first time (t1). An error distance determination unit determines a velocity of the movement of the moving device and at least one error distance ($\alpha_{err1}$, $\alpha_{err2}$, $\alpha_{err3}$) specifying a distance by which the moving device moves on between the first time (t1) and a second time (t2) in dependence on the velocity and a propagation delay time ($T_{pd}$). A position correction unit is configured to determine a corrected position ($\alpha_{corr}$) in dependence on the at least one error distance ($\alpha_{err1}$, $\alpha_{err2}$, $\alpha_{err3}$) and the first position ($\alpha 0_{(t1)}$).

17 Claims, 5 Drawing Sheets

(56) References Cited

U.S. PATENT DOCUMENTS

| | | | | |
|---|---|---|---|---|
| 6,972,534 B1* | 12/2005 | Schulz | ............ | H02P 21/22 |
| | | | | 318/400.02 |
| 2004/0006443 A1* | 1/2004 | Huber-Lenk | ........ | G03F 7/70725 |
| | | | | 702/150 |
| 2006/0206613 A1* | 9/2006 | Narita | ............ | H04L 69/28 |
| | | | | 709/227 |
| 2010/0225307 A1* | 9/2010 | Takahashi | ......... | G01D 3/036 |
| | | | | 324/207.25 |
| 2012/0212162 A1* | 8/2012 | Wu | ............ | H02P 21/14 |
| | | | | 318/400.02 |

FOREIGN PATENT DOCUMENTS

| | | |
|---|---|---|
| DE | 3243759 A1 | 5/1984 |
| DE | 3737435 A1 | 5/1989 |
| JP | S63229320 A | 9/1988 |
| JP | H0526686 A | 2/1993 |
| JP | H08261794 A | 10/1996 |
| JP | 2007256034 A | 10/2007 |

* cited by examiner

POSITION SENSOR DEVICE TO DETERMINE A POSITION OF A MOVING DEVICE

TECHNICAL FIELD

The invention relates to a position sensor device to determine a position of a moving device. The invention further relates to a method to determine a position of a moving device.

BACKGROUND

In applications with moving devices, for example rotating devices, it is often desired to obtain an information regarding a position of the moving device. The moving device may be configured as a rotating device and the position may be a rotating angle of the rotating device. The rotating device may comprise a magnet so that a rotating magnetic field is generated by the magnet during the rotation of the rotating device. In order to determine a current position of the rotating device during the rotary movement, a position sensor device which may be configured as a magnetic position sensor device may be used. The magnetic position sensor device may detect an evaluate the rotating magnetic field generated by the rotating magnet in order to provide an information regarding the position of the rotating device.

The magnetic position sensor device may be arranged in the proximity of the rotating magnet to detect the rotating magnetic field during the rotary movement of an axis of the rotating device. The magnet may, for example, be mounted to the axis of the rotating device. The position of the rotating device may be indicated by specifying the rotating angle of the rotating device. A predefined position of the rotating device may be defined as having a rotating angle of 0°. The rotating angles in the range between 0° and 360° indicate the position of the rotating device in relation to the 0° position.

The position sensor device may comprise a detection unit to detect a signal generated by the moving device and an evaluation unit to determine the position of the moving device. The position sensor device configured as magnetic position sensor device may comprise a detection unit to detect the magnetic field of the magnet and an evaluation unit to determine the position of the rotating device by evaluating the detected rotating magnetic field. The detection unit of the position sensor device may comprise optical sensors or magnetic sensors, such as Hall-sensors, and an analogue front-end comprising front-end amplifier, filter components etc. The evaluation unit may comprise an analogue-to-digital converter and a digital backend executing, for example, decimation filtering and a CORDIC algorithm. Both the analogue detection unit and the digital back-end of the evaluation unit introduce a delay during the calculation of the position of the moving device. This delay time is known as system propagation delay.

Due to this latency time between the measurement and evaluation of the signal generated by the moving device, for example a magnetic field vector, and the moment in time when the position of the moving device, for example the rotating angle of the rotating device, is available, for example through an SPI interface, the position sensor device can introduce a position error, for example an angle error. The position error is proportional to the speed of the moving device. In the example of a magnetic position sensor device, the angle error is proportional to the speed of the rotary movement of the rotating device. In high speed applications the contribution of the dynamic position error can be substantially big. Since reducing the latency of the position sensor would increase the output noise, it is in general not possible to reduce the system propagation delay.

In a medium resolution magnetic position sensor device having, for example a resolution of 10 bit, the error occurred during the calculation of the rotating angle represents already a few LSBs at highspeed rotation. In addition there are several applications where the maximum speed is also substantially higher. This error contribution generally does not allow employing such a sensor. Furthermore, magnetic position sensors with a high resolution slow core, for example sigma delta based, need an embedded interpolator which introduces a further source of delay.

It is desirable to provide a position sensor device to determine a position of a moving device which enables to compensate the position error obtained during the determination of the position due to a propagation delay time of the position sensor device. Furthermore, there is a desire to specify a method to determine a position of a moving device which enables to compensate the position error obtained during the determination of the position due to a propagation delay time of the position sensor device.

SUMMARY

A position sensor device to determine a position of a moving device is specified in claim 1. According to an embodiment of the position sensor device, the sensor device comprises a detection unit to detect a signal generated by the moving device. The detection unit is configured to detect the signal at a first time. The position sensor device further comprises an evaluation unit to determine a position of the moving device by evaluating the detected signal. The evaluation unit is configured to detect a first position specifying the position of the moving device at the first time. The position sensor device further comprises an error distance determination unit to determine at least one error distance, wherein said at least one error distance specifies a distance by which the moving device moves on between the first time and a second time, wherein said second time is after the first time. The position sensor device may comprise a position correction unit to output a corrected position, wherein said corrected position specifies the position of the moving device at the second time. The error distance determination unit is configured to determine a velocity of the movement of the moving device and to determine the at least one error distance in dependence on the velocity of the movement of the moving device and in dependence on a delay time specifying the time duration between the first time and the second time. The position correction unit is configured to determine the corrected position in dependence on said at least one error distance and the first position.

The error distance determination unit may be configured to determine a first one of the at least one error distance. The error distance determination unit may be configured to determine the first error distance in dependence on the velocity of the movement of the moving device between the first time and a prior time.

The evaluation unit may be configured to evaluate the detected signal at the first time and the prior time. The evaluation unit may be configured to determine a prior position of the moving device specifying the position of the moving device at the prior time. The error distance determination unit may be configured to determine the velocity of the movement of the moving device in dependence on a difference between the first position and the prior position and a difference between the first time and the prior time.

The position correction unit may be configured to determine the corrected position in dependence on a sum of the first position and the first error distance.

The error distance determination unit may be configured to determine an acceleration of the movement of the moving device and to determine a second one of the at least one error distance in dependence on the acceleration of the movement of the moving device and the delay time. The position correction unit is configured to determine the corrected position in dependence on the second error distance. The position correction unit is configured to determine the corrected position in dependence on a sum of the first position and the first error distance and the second error distance.

The error distance determination unit may be configured to determine a change of the acceleration of the movement of the moving device and to determine a third one of the at least one error distance in dependence on the change of the acceleration of the movement of the moving device and the delay time. The position correction unit is configured to determine the corrected position by adding the third error distance to the sum of the first position and the first error distance and the second error distance.

An embodiment of a method to determine a position of a moving device is defined in claim 12. The method comprises a step of detecting a signal generated by a moving device at a first time. A first position of the moving device may be determined by evaluating the detected signal at the first time, said first position specifying the position of the moving device at the first time. A velocity of the movement of the moving device is determined. At least one error distance is determined in dependence on the velocity of the movement of the moving device and a delay time, wherein said at least one error distance specifies a distance by which the moving device moves on between the first time and a second time, said second time being after the first time, wherein the delay time specifies the time duration between the first time and the second time. A corrected position is determined in dependence on the at least one error distance and the first position, wherein said corrected position specifies the position of the moving device at the second time.

According to the method, a first one of the at least one error distance may be determined. The first error distance may be determined in dependence on the velocity of the movement of the moving device between the first time and a prior time. The corrected position may be determined in dependence on the first position and the first error distance.

According to another embodiment of the method, an acceleration of the movement of the moving device may be determined. A second one of the at least one error distance may be determined in dependence on the acceleration of the movement of the moving device and the delay time. The corrected position may be determined in dependence on the second error distance. The corrected position may be determined in dependence on a sum of the first position and the first error distance and the second error distance.

According to another embodiment of the method, a change of the acceleration of the movement of the moving device may be determined. A third one of the at least one error distance in dependence on the change of the acceleration of the movement of the moving device and the delay time may be determined. The corrected position may be determined by adding the third error distance to the sum of the first position and the first error distance and the second error distance.

The position sensor device may be configured as a magnetic position sensor device to determine a position of a rotating device comprising a rotating magnet. According to this embodiment, the detection unit is configured to detect the rotating magnetic field generated by the magnet at a first time. The evaluation unit is configured to determine a rotating angle of the rotating magnet by evaluating the detected rotating magnetic field. The evaluation unit is configured to detect a first rotating angle specifying the position of the rotating magnet at the first time. The error distance determination unit is configured to determine at least one error angle, wherein said at least one error angle specifies an angle by which the rotating magnet turns on between the first time and a second time, wherein said second time is after the first time. The position correction unit is configured to output a corrected rotating angle, wherein said corrected rotating angle specifies the position of the rotating magnet at the second time. The error distance determination unit is configured to determine a velocity of the rotation of the rotating magnet and to determine the at least one error angle in dependence on the velocity of the rotation of the rotating magnet and in dependence on the delay time specifying the time duration between the first time and the second time. The position correction unit is configured to determine the corrected position in dependence on said at least one error angle and the first rotating angle.

The method to determine a position of a moving device defined in claim 12 may be used to determine a position of a rotating device comprising a rotating magnet. A rotating magnetic field of the rotating magnet is detected at the first time. A first rotating angle of the rotating magnet may be determined by evaluating the detected rotating magnetic field at the first time, said first rotating angle specifying the position of the rotating magnet at the first time. A velocity of the rotation of the rotating magnet is determined. At least one error angle is determined in dependence on the velocity of the rotation of the rotating magnet and the delay time, wherein said at least one error angle specifies an angle by which the rotating magnet turns on between the first time and the second time. A corrected rotating angle is determined in dependence on the at least one error angle and the first rotating angle, wherein said corrected rotating angle specifies the position of the rotating magnet at the second time.

The velocity/speed of the rotating device and thus the velocity/speed of the rotating magnet may be calculated by the error distance determination unit based on the rotating angle measurement by means of the detection unit and the evaluation unit. According to an embodiment of the position sensor device, the error distance determination unit may be configured to determine a first one of the at least one error angle. The error distance determination unit may be configured to determine the first error angle in dependence on the velocity of the rotation of the rotating magnet and a system propagation delay time.

The evaluation unit may be configured to evaluate the detected rotating magnetic field at the first time and at the prior time which is prior to the first time in order to determine the velocity of the rotating magnet. The evaluation unit is configured to determine the rotating angle of the rotating magnet at the first time and to determine a prior rotating angle of the magnet which specifies the position of the rotating magnet at the prior time. The error distance determination unit may be configured to determine the velocity of the rotating magnet in dependence on a first difference between the rotating angle attributed to the first time and the prior rotating angle attributed to the prior time and on a second difference between the first and the prior time. The velocity may be obtained by calculating the quotient of the first and second difference.

Assuming that the (propagation) delay time of the position sensor is known, the error distance determination unit may be configured to determine the first error angle by calculating the product of the determined velocity and the propagation delay time. The position correction unit may be configured to determine the corrected rotating angle by calculating a sum of the rotating angle attributed to the first time and the first error angle.

The compensation of the position error according to the embodiment of the position sensor device as described above works correctly, if the moving device moves with a constant speed, for example, if the rotating device rotates with a constant speed, as it represents a linear compensation method. The compensation method may be extended to a higher order of compensation to be able to compensate a position error caused by a constant acceleration or a constant increasing acceleration.

According to another embodiment of the position sensor device which enables to compensate an error caused by a constant acceleration of the rotating device, the error distance determination unit may be configured to determine an acceleration of the rotation of the rotating magnet and to determine a second error angle by accounting for the determined acceleration. In order to compensate an angle error caused by a constant acceleration, the position correction unit may be configured to determine the corrected rotating angle by adding the second error angle to the sum of the rotating angle attributed to the first time and the first error angle.

According to another embodiment of the position sensor device which enables to compensate an error caused by a constant increasing acceleration of the rotating device, the error distance determination unit may be configured to determine a change of the acceleration of the rotation of the rotating magnet and to determine a third error angle by accounting for the determined change of the acceleration of the rotating magnet. In order to compensate an angle error caused by the change of the acceleration, the position correction unit may be configured to determine the corrected rotating angle by adding the third error angle to the sum of the rotating angle attributed to the first time and the first and the second error angle.

The position sensor device and the method to determine a position of the moving device enables to drastically reduce the dynamic position error and relaxes the trade-off between noise and system propagation delay. By using the method or the position sensor device with the method implemented inside, it is possible to increase the speed of the moving device without increasing the dynamic position error. The compensation works even if the system propagation delay drifts. Internal compensation allows cancelling out the drift of the system propagation delay caused by a clock signal generated by an oscillator circuit, wherein the clock signal is used by the evaluation unit and the error distance determination unit for the speed calculation.

Since all components for determining the corrected position are implemented in the chip of the position sensor device, there is no need for an external unit which does the compensation. High resolution encoders can still be implemented using Sigma Delta ADC and decimation filtering. According to an embodiment of the position sensor device not all the components of the position sensor are arranged on the same circuit board. For such an embodiment it is possible to include the delay introduced by an interface, for example SPI, UART, etc., to compensate the dynamic angle error additionally introduced by the delay of the interface. It is to be understood that both the foregoing general description and the following detailed description present embodiments and are intended to provide an overview or a framework for understanding the nature and character of the disclosure. The accompanying drawings are included to provide a further understanding, and are incorporated into and constitute a part of this specification. The drawings illustrate various embodiments and, together with the description, serve to explain the principles and operation of the concepts disclosed.

DETAILED DESCRIPTION

Figure 1:
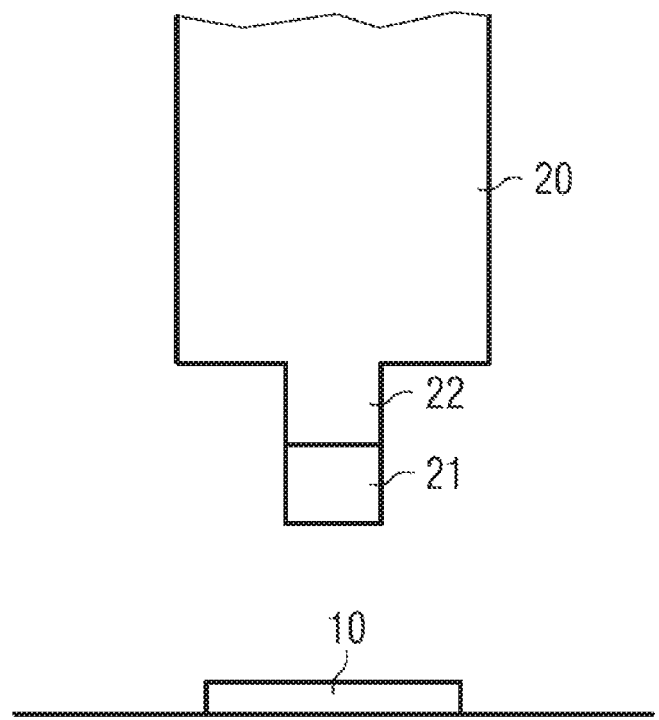
FIG. 1 shows an embodiment of an arrangement of a position sensor device and a rotating device.

FIG. 1 shows an embodiment of a position sensor device 10 to determine a position of a moving device 20. The position sensor may be configured as a magnetic position sensor device to determine a position of a rotating device. The rotating device may be configured as a motor. The rotating device 20 may comprise a magnet 21 and a rotating axis 22 on which the magnet 21 is mounted. The magnet 21 generates a magnetic field which rotates with the rotary movement of the axis 22 of the rotating device 20. The position sensor device 10 is configured to detect the rotating magnetic field and to determine a position of the rotating magnet in dependence on an evaluation of the rotating magnetic field.

The position of the rotating magnet 21 which is equivalent to the position of the rotating device 20 may be output by the position sensor device 10 as a rotating angle, wherein the 0° position defines a predefined basic position of the rotating magnet and other rotating angles between the 0° and the 360° position specify other rotational positions of the magnet relative to the basic position.

FIGS. 2, 3, 4 and 5 show embodiments of the position sensor device 10. The features and components which are common to all the embodiments of the position sensor device are firstly described before the embodiments are discussed in detail with reference to the illustrations in the respective Figures.

In order to determine a position, for example a rotating angle, of a rotating magnet 21, the position sensor device detects a magnetic field strength of the magnet 21. To this purpose, the position sensor device 10 may comprises a detection unit 100 including sensors 101, such as Hall sensors, to detect the magnetic field of the magnet 21, and an analogue front-end 102 comprising components to process the signals output by the sensors 101. The analogue front-end 102 may comprise front-end amplifiers and filters. The analogue front-end 102 is coupled to the sensors 101 to receive and process the signals of the sensors 101. The detection unit 100 may be configured to detect the rotating magnetic field at a first time t1.

The detection unit 100 is coupled to an evaluation unit 110 to determine a rotating angle $\alpha 0_{(t)}$ at a time t by evaluating the rotating magnetic field detected at the time t. The detection unit 110 may comprise an analogue-to-digital converter 111 and an digital back-end 112. The digital back-end may comprise a decimation filter and may determine the rotating angle $\alpha 0_{(t1)}$ by implemented algorithms, such as the CORDIC algorithm. The evaluation unit 110 is configured to detect a rotating angle $\alpha 0_{(t1)}$ specifying the position of the rotating magnet 21 at the first time t1.

Figure 2:
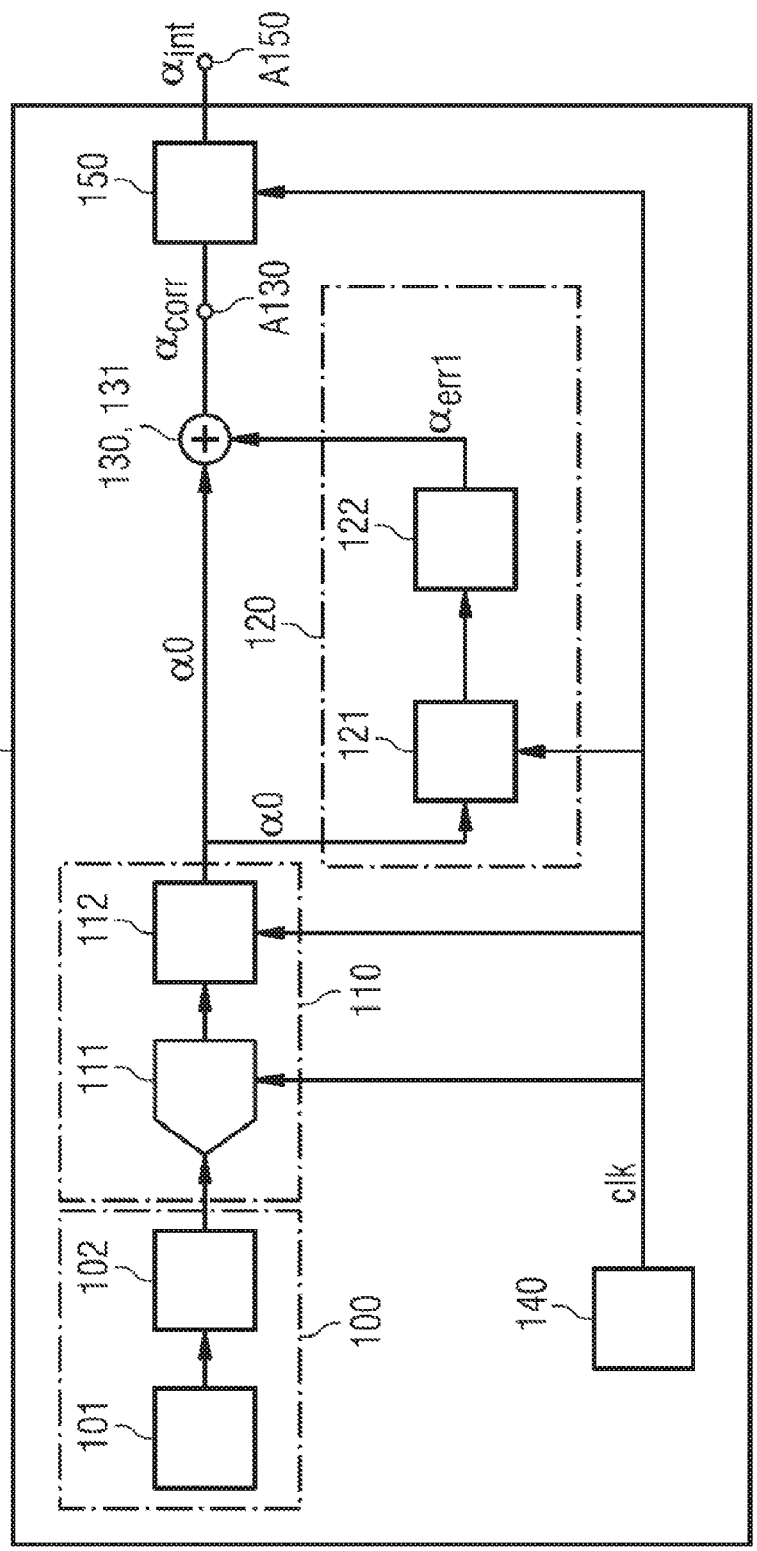
FIG. 2 shows a first embodiment of a position sensor device.
Figure 4:
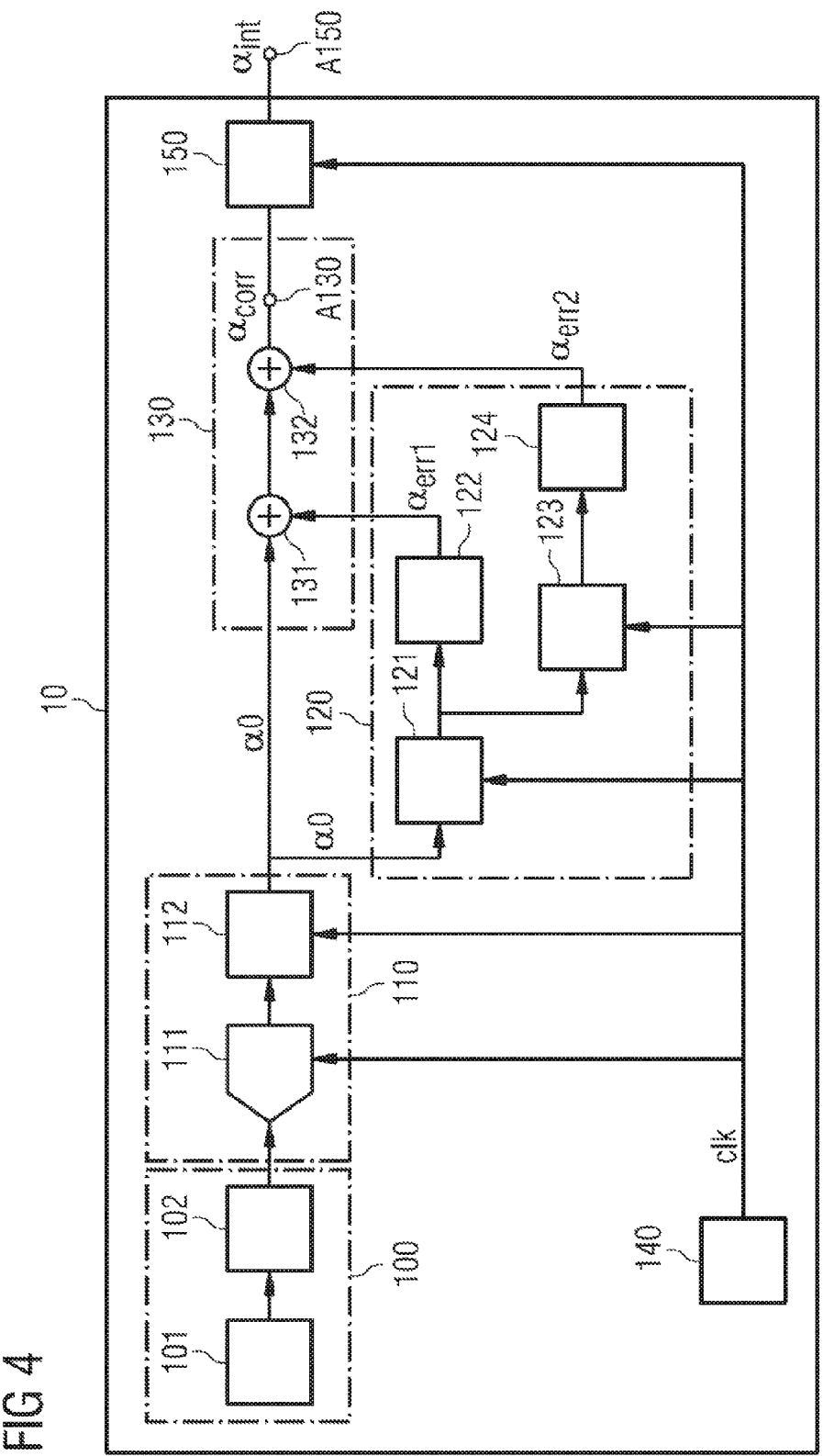
FIG. 4 shows a second embodiment of a position sensor device.
Figure 5:
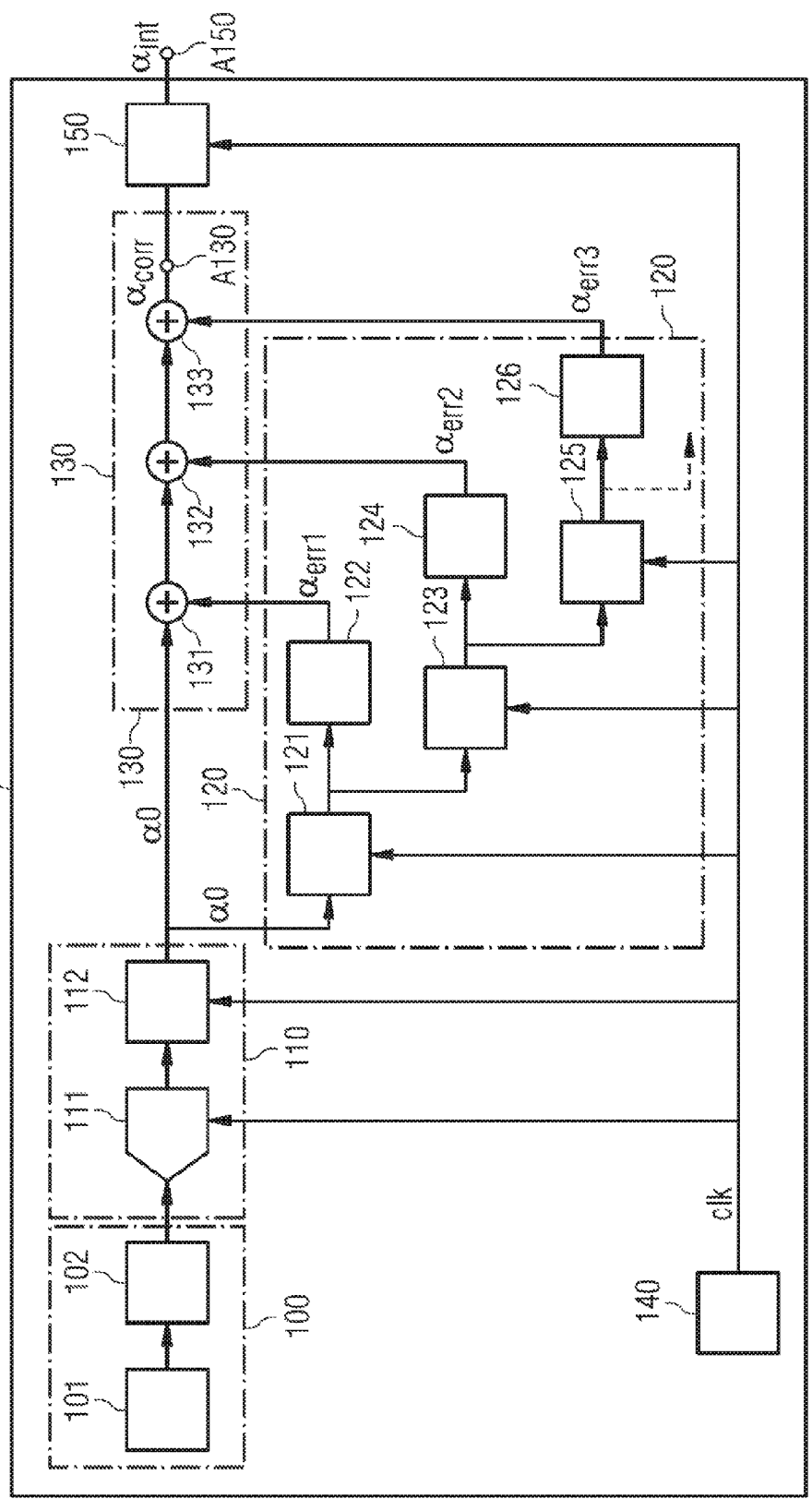
FIG. 5 shows a third embodiment of a position sensor device.

The position sensor device 10 may comprise an error distance determination unit 120 to determine at least one error angle $\alpha_{err1}$, $\alpha_{err2}$, $\alpha_{err3}$ shown in FIGS. 2, 4 and 5. The at least one error angle $\alpha_{err1}$, $\alpha_{err2}$, $\alpha_{err3}$ specifies an angle by which the rotating magnet 21 turns on between the first time t1 and a second time t2, wherein the second time t2 is after the first time t1. The position sensor device 10 further comprises a position correction unit 130 to output a corrected rotating angle $\alpha_{corr}$. The corrected rotating angle $\alpha_{corr}$ specifies the position of the rotating magnet 21 at the second time t2. The error distance determination unit 120 may be configured to determine a velocity of the rotation of the rotating magnet 21. The error distance determination unit may further be configured to determine the at least one error angle $\alpha_{err1}$, $\alpha_{err2}$, $\alpha_{err3}$ in dependence on the velocity of the rotation of the rotating magnet 21 and in dependence on a delay time $T_{pd}$ specifying the time duration between the first time t1 and the second time t2. The position correction unit 130 is configured to determine the corrected rotating angle $\alpha_{corr}$ in dependence on the at least one error angle $\alpha_{err1}$, $\alpha_{err2}$, $\alpha_{err3}$ and the rotating angle $\alpha 0_{(t1)}$.

The embodiments of the position sensor device shown in FIGS. 2, 3, 4 and 5 are configured to provide a method to determine a position of a moving device which may comprise the magnet 21. In a first step of the method a rotating magnetic field of the rotating magnet 21 is detected by the detection unit 100 at the first time t1. A rotating angle $\alpha 0_{(t1)}$ of the rotating magnet 21 is determined in a subsequent step by the evaluation unit 110. To this purpose, the evaluation unit 110 evaluates the detected rotating magnetic field which has been detected by the detection unit 100 at the first time t1, wherein the rotating angle $\alpha 0_{(t1)}$ specifies the position of the rotating magnet 21 at the first time t1. A velocity of the rotation of the rotating magnet 21 is determined by the error distance determination unit. After having determined the velocity of the rotary movement at least one error angle $\alpha_{err1}$, $\alpha_{err2}$, $\alpha_{err3}$ is determined in dependence on the velocity of the rotation of the rotating magnet 21 and the delay time $T_{pd}$. The at least one error angle $\alpha_{err1}$, $\alpha_{err2}$, $\alpha_{err3}$ specifies an angle by which the rotating magnet 21 is turned on between the first time t1 and a second time t2, wherein said second time t2 is after the first time t1. A corrected rotating angle $\alpha_{corr}$ is determined by the angle correction unit 130 in dependence on the at least one error angle $\alpha_{err1}$, $\alpha_{err2}$, $\alpha_{err3}$ and the rotating angle $\alpha 0_{(t0)}$. The corrected rotating angle $\alpha_{corr}$ specifies the position of the rotating magnet 21 at the second time t2.

The position sensor device may evaluate detected states of the detected rotating magnetic field at different times. The evaluation unit may determine rotating angles at subsequent time intervals. The evaluation unit may, for example, determine the rotating angle $\alpha 0_{(t1)}$ at the first time t1 and a second rotating angle $\alpha 0_{(t3)}$ at a time t3 subsequent to the time t1. The error distance determination unit may determine an error angle attributed to the rotating angle $\alpha 0_{(t1)}$ and a subsequent error angle attributed to the second rotating angle $\alpha 0_{(t3)}$. The position sensor device may comprise an oscillator circuit 140 to generate a clock signal clk to operate the evaluation unit 110 and the error distance determination unit 120 such that subsequent rotating angles and attributed corrected rotating angles are generated by the evaluation unit 110 and the error distance determination unit in a time interval Ts or with a sampling rate Ts being dependent from the clock signal clk.

The oscillator circuit 140 may provide the clock signal clk for operating the evaluation unit 110 and the error distance determination unit 120. The evaluation unit 110 is configured to evaluate the detected rotating magnetic field with the sampling rate Ts to determine subsequent rotating angles. The clock signal clk is also applied to the error distance determination unit 120 to determine a respective error angle attributed to a rotating angle. The respective corrected rotating angle $\alpha_{corr}$ attributed in each case to a detected rotating angle $\alpha 0$ may be output at an output terminal A130 of the position correction unit 130. The delay time $T_{pd}$ may be a propagation delay time specifying the time duration between the time t1 at which the magnetic field is detected and a time t2 at which the corrected rotating angle $\alpha_{corr}$ is output at the output terminal A130 of the angle correction unit. The delay time $T_{pd}$ mainly comprises the propagation delay time of the evaluation unit 110 and the error distance determination unit 120.

The delay time $T_{pd}$ may also comprise the delay time of the analogue components, i.e. the detection unit 100 for detecting the rotating magnetic field. This allows to consider the typical analogue delay which is only a small fraction of the total propagation delay and only the drift of the typical analogue delay by process and temperature variations stays uncompensated. The portion of the process and temperature variations of the analogue delay is very small and only in the order of about 1 μs and may be measured separately and added to the typical analogue delay.

The corrected rotating angle $\alpha_{corr}$ may be output at the output terminal by a sequence of high significant bits (HSB) and low significant bits (LSB). The sampling frequency may be too slow to follow every LSB step at full rotational speed of the rotating magnet. According to another embodiment of the position sensor which is also shown in FIGS. 2, 3, 4 and 5, the correction of the dynamic angle error may optionally be performed by using an interpolator circuit 150.

The interpolator circuit may increase the resolution of the determination of rotating angles. The interpolator circuit 150 enables to output interpolated rotating angles $\alpha_{int}$ between subsequent corrected rotating angles determined by the error angle determination unit 120 in subsequent time intervals predefined by the sampling frequency or the sampling rate Ts. An exemplified embodiment of the interpolator circuit 150 is described below with reference to FIG. 3. The delay time $T_{pd}$ may optionally comprise the delay time of the interpolator circuit.

FIG. 2 shows an embodiment of the position sensor device which is able to compensate an error caused by a dynamic angle error in a rotational system having a constant rotational speed. The error distance determination unit 120 comprises a component 121 which is configured for the calculation of the velocity of the rotating magnet. The error distance determination unit 120 may further comprise a component 122 which is provided for calculating an error angle $\alpha_{err1}$ caused by the rotational speed of the rotating magnet. The error angle $\alpha_{err1}$ is the product of the rotational speed ω of the rotating magnet and the propagation delay time $T_{pd}$ of the position sensor device and may be expressed by the formula $\alpha_{err1} = \omega \cdot T_{pd}$.

The component 122 is configured to determine the error angle $\alpha_{err1}$ by calculating the product of the rotational speed of the rotating magnet and the propagation delay of the position sensor. In order to determine the corrected rotating angle $\alpha_{corr}$ the position correction unit is configured as an adder 131 to add the error angle $\alpha_{err1}$ and the rotating angle $\alpha 0_{(t1)}$ determined by the evaluation unit 110 from the rotating magnetic field detected by the detection unit 100 at the time t1.

Figure 3:
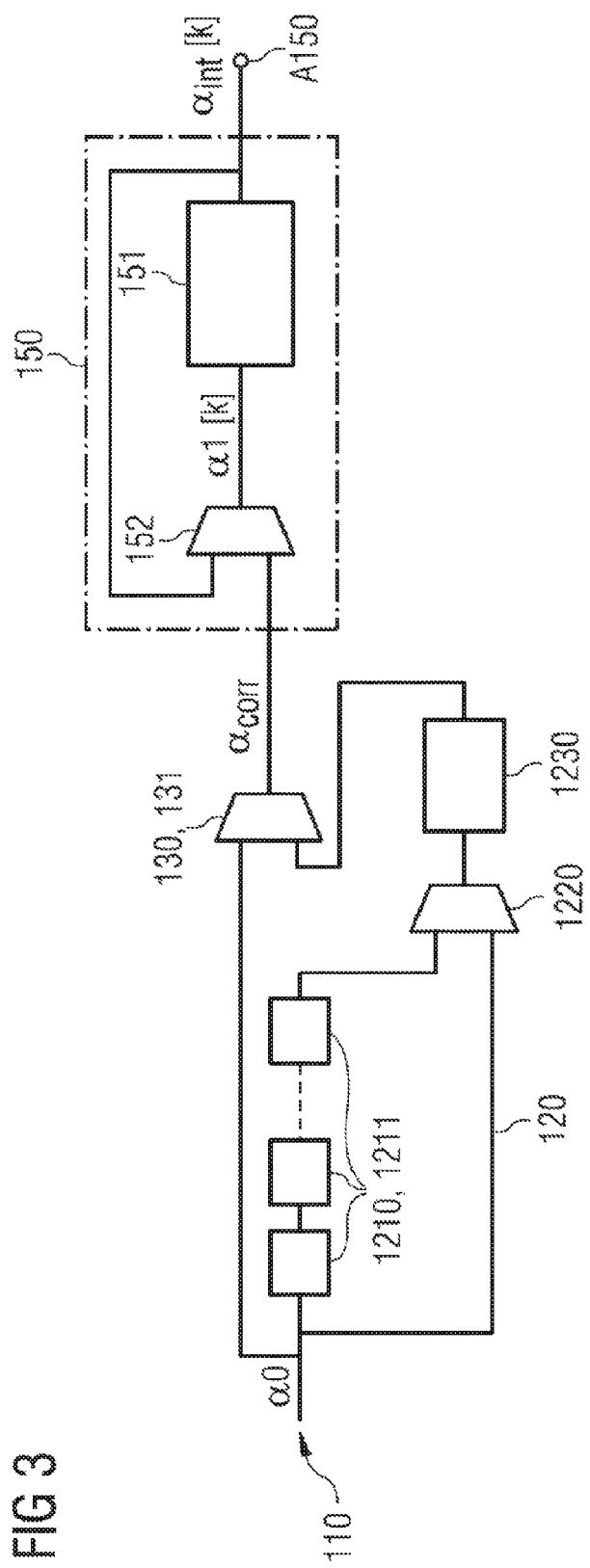
FIG. 3 shows an embodiment of an error distance determination unit, a position correction unit and an interpolator of a position sensor device.

FIG. 3 shows an embodiment of the error distance determination unit 120, the position correction unit 130 and the interpolator circuit 150 of the position sensor device 10. The error distance determination unit 120 is configured to determine the error angle $\alpha_{err1}$ in dependence on the velocity of the rotation of the rotating magnet 21 between the first time t1 and a prior time t0. The prior time t0 is a time which is before the time t1. The evaluation unit 110 is configured to evaluate the detected rotating magnetic field at the first time t1 and at the prior time t0. The evaluation unit 110 is configured such that the time duration between the first time t1 and the prior time t0 is a multiple of an integer value of the time interval Ts being dependent on the clock signal clk.

The evaluation unit 110 is configured to determine a prior rotating angle $\alpha 0_{(t0)}$ of the rotating magnet specifying the position of the rotating magnet at the prior time t0 and to determine the rotating angle $\alpha 0_{(t1)}$ of the rotating magnet specifying the position of the rotating magnet at the first time t1. The velocity of the rotating magnet may be calculated by $$\omega = \frac{\alpha 0_{(t1)} - \alpha 0_{(t0)}}{t1 - t0}$$

or with t=t1 and $\Delta t_{speed}$=t1−t0 by the general formula $$\omega = \frac{\alpha 0_{(t)} - \alpha 0_{(t-\Delta t_{speed})}}{\Delta t_{speed}}.$$

Assuming that the evaluation unit 110 generates subsequent error angles with a sampling rate Ts, $\Delta t_{speed}$ is chosen as a multiple of the sampling rate Ts. In order to obtain a new speed value $\omega$ for every new sample of the rotating angle $\alpha 0$, $\Delta t_{speed}$ is implemented by a digital delay chain 1210. The digital delay chain comprises delay elements 1211 delaying the detected rotating angle to obtain the prior rotating angle $\alpha 0_{(t-\Delta t_{speed})}$ or $\alpha 0_{(t0)}$ with t0=t−$\Delta t_{speed}$.

The error distance determination unit 120 further comprises a subtractor 1220 to determine the difference between the current rotating angle $\alpha 0_{(t1)}$ and the prior rotating angle $\alpha 0_{(t0)}$. The error distance determination unit 120 is configured to determine the velocity of the rotation of the rotating magnet 21 in dependence on a difference between the rotating angle $\alpha 0_{(t1)}$ and the prior rotating angle $\alpha 0_{(t0)}$ and a difference between the first time t1 and the prior time t0. The error distance determination unit 120 comprises a calculation unit 1230 which may be configured as a multiplication unit to determine the velocity of the rotating magnet by calculating the quotient of the difference between the rotating angle $\alpha 0_{(t1)}$ and the prior rotating angle $\alpha 0_{(t0)}$ and the difference between the first time t1 and the prior time t0. The calculation unit 1230 may further be configured to determine the error angle $\alpha_{err1}$ by multiplying the calculated velocity $\omega$ of the rotating magnet with the delay time $T_{pd}$.

The position correction unit 130 may be configured to determine the corrected rotating angle $\alpha_{corr}$ in dependence on a sum of the rotating angle $\alpha 0_{(t1)}$ and the error angle $\alpha_{err1}$. The position correction unit 130 may comprise an adder 131 to add the current rotating angle $\alpha 0_{(t1)}$ determined for the first time t1 and the error angle $\alpha_{err1}$. The position correction unit 130 may comprise an output terminal A130 to output the corrected rotating angle $\alpha_{corr}$. The delay time $T_{pd}$ may be the propagation delay time between the detection of the magnetic field by the detection unit 100 at the first time t1 and the output of the determined corrected rotating angle $\alpha_{corr}$ at the output terminal A130 at the second time t2.

The position sensor may optionally comprise the interpolator circuit 150 having an output terminal A150 to output a plurality of interpolated rotating angles $\alpha_{int}[k]$ and the corrected rotating angle $\alpha_{corr}$. The interpolated rotating angles specify the position of the rotating magnet 21 between subsequent time intervals Ts at which the position correction unit 130 determined the subsequent corrected rotating angles $\alpha_{corr}$. An angle interpolator unit 151 will increase/decrease the angle output by a value of $\alpha 1[k]$, k=1, ..., n applied to its input side. This will take exactly a time Ts=1/Fs with Fs being the sampling frequency. The value of $\alpha 1[k]$ is the difference of the actual value of $\alpha_{int}[k]$ and the new corrected rotating angle expected at a time t+Ts.

If the position correction unit determined, for example, a first corrected rotating angle $\alpha 0_{(t1)}$ for the first time t1 and a subsequent second rotating angle $\alpha 0_{(t3)}$ at a third time t3=t1+Ts, wherein the third time t3 is after the first time t1, the interpolator unit 151 determines a plurality of interpolated rotating angles $\alpha_{int}[k]$ with k=1, ..., n between the rotating angle $\alpha 0_{(t1)}$ and the second rotating angle $\alpha 0_{(t3)}$.

If the position sensor device comprises the interpolator circuit 150, the delay time $T_{pd}$ may also comprise the propagation delay time specifying the time duration between the calculation of the rotating angle $\alpha 0$ and the output of the interpolated rotating angles $\alpha_{int}[k]$ at the output terminal A150 of the interpolator circuit 150 at the second time t2.

The delay time $T_{pd}$ may also comprise the delay time of the analogue components, i.e. the detection unit 100 for detecting the rotating magnetic field. This allows to consider the typical analogue delay which is only a small fraction of the total propagation delay and only the drift of the typical analogue delay by process and temperature variations stays uncompensated. The portion of the process and temperature variations of the analogue delay is very small and only in the order of about 1 µs and may be measured separately and added to the typical analogue delay.

The delay time $T_{pd}$ may be a multiple of the period of the sampling rate Ts which is dependent on the clock signal clk. The delay time $T_{pd}$ typically changes in production and over the temperature with a frequency drift of the oscillator circuit 140. Any variation of the delay time $T_{pd}$ caused by a drift of the oscillator circuit 140 may be compensated, because the term $$\frac{T_{pd}}{\Delta t_{speed}}$$

in the equation $\alpha_{err1}=\omega \cdot T_{pd}$ is independent from the oscillator frequency. The proposed embedded implementation allows canceling the drift of the system propagation delay as it would use the same time base given by the clock signal clk.

FIG. 4 shows an embodiment of the position sensor device 10 which enables to additionally consider a constant acceleration of the rotating magnet 21. According to the embodiment of FIG. 4 the error distance determination unit 120 is configured to determine an acceleration of the rotation of the rotating magnet 21 and to determine an error angle $\alpha_{err2}$ in dependence on the acceleration of the rotation of the rotating magnet 21 and the delay time $T_{pd}$. The error distance determination unit 120 may comprise a component 123 to determine an acceleration a of the rotating magnet based on a evaluation of the velocity of the rotating magnet and a component 124 to determine the error angle $\alpha_{err2}$. The component 123 may be configured to determine the acceleration a of the rotating magnet by calculating a derivation of the velocity ω of the rotating magnet. The component 123 may be configured to determine the acceleration based on a calculation of a difference between two values of the velocity ω at different times divided by the difference between the two different times.

The error angle $\alpha_{err2}$ results from the formula $\alpha_{err2} = \frac{1}{2} \cdot \alpha \cdot T_{pd}$. The component 124 may be configured to determine the error angle $\alpha_{err2}$ by multiplying the calculated acceleration a of the rotating magnet with the square of the delay time $T_{pd}$ and a constant factor.

The position correction unit 130 is configured to determine the corrected rotating angle $\alpha_{corr}$ in dependence on the second error angle $\alpha_{err2}$. The position correction unit 130 may be configured to determine the corrected rotating angle $\alpha_{corr}$ in dependence on a sum of the rotating angle $\alpha 0_{(t1)}$ and the error angle $\alpha_{err1}$ and the second error angle $\alpha_{err2}$. To this purpose, the position correction unit 130 may additionally comprise an adder 132. If the rotary movement of the rotating magnet 21 is only a constant acceleration the error angle $\alpha_{err1}$ is zero and the corrected rotating angle only depends on the sum of the rotating angle $\alpha 0_{(t1)}$ and the error angle $\alpha_{err2}$.

FIG. 5 shows an embodiment of the position sensor device 10 which enables to additionally consider a change of the acceleration of the rotating magnet 21 and particularly a constant increasing acceleration. According to the embodiment of FIG. 5 the error distance determination unit 120 is configured to determine a change of the acceleration of the rotation of the rotating magnet 21 and to determine an error angle $\alpha_{err3}$ in dependence on the change of the acceleration of the rotation of the rotating magnet 21 and the delay time $T_{pd}$. The error distance determination unit 120 may comprise a component 125 to determine a change of the acceleration of the rotating magnet based on an evaluation of the acceleration of the rotating magnet. The error distance determination unit 120 may further comprise a component 126 to determine the error angle $\alpha_{err3}$. The angle correction unit 130 may comprise an adder 133. The angle correction unit 130 is configured to determine the corrected rotating angle $\alpha_{corr}$ by adding the error angle $\alpha_{err3}$ to the sum of the rotating angle $\alpha 0_{(t1)}$ and the error angle $\alpha_{err1}$ and the error angle $\alpha_{err2}$ by means of the adder 133. As shown by the arrow illustrated with broken lines between the components 125 and 126, the error distance determination unit 120 may comprise further stages to determine error angles of higher orders.

The configuration and functioning of the position sensor has been explained by means of a position sensor device being configured as a magnetic position sensor device. However, the position sensor device and the method to determine a position of the moving device is not limited to a rotation measurement by a magnetic position sensor but can also be used in, for example, linear position measurement. The detection unit may comprise, for example, an optical sensor to detect an optical signal generated by the moving device or a capacitive sensor to detect an electrical signal generated by the moving device. The evaluation unit may detect a position instead of a rotating angle. The error distance determination unit may determine at least one error distance $\alpha_{err1}$, $\alpha_{err2}$, $\alpha_{err3}$, wherein said at least one error distance $\alpha_{err1}$, $\alpha_{err2}$, $\alpha_{err3}$ specifies a distance by which the moving device moves on between the first time t1 and the second time t2 being after the first time t1. The position correction unit 130 is configured to output the corrected position $\alpha_{corr}$, wherein said corrected position $\alpha_{corr}$ specifies the position of the moving device at the second time t2. The error distance determination unit 120 is configured to determine a velocity of the movement of the moving device and to determine the at least one error position $\alpha_{err1}$, $\alpha_{err2}$, $\alpha_{err3}$ in dependence on the velocity of the movement of the moving device and in dependence on the delay time $T_{pd}$ specifying the time duration between the first time t1 and the second time t2. The position correction unit 130 is configured to determine the corrected position $\alpha_{corr}$ in dependence on said at least one error position $\alpha_{err1}$, $\alpha_{err2}$, $\alpha_{err3}$ and the first position $\alpha 0_{(t1)}$.

Many modifications and other embodiments set forth herein will come to mind to one skilled in the art to which the embodiments pertain having the benefit of the teachings presented in the foregoing descriptions and the associated drawings. Therefore, it is to be understood that the description and the claims are not to be limited to the specific embodiments disclosed and that modifications and other embodiments are intended to be included within the scope of the appended claims. It is intended that embodiments cover the modifications and variations of the embodiments provided they come within the scope of the appended claims and their equivalents. Although specific terms are employed herein, they are used in a generic and descriptive sense only and not for purposes of limitation.

The invention claimed is:

1. A position sensor device to determine a position of a moving device, comprising:
   a detection unit to detect a signal generated by the moving device, the detection unit being configured to detect the signal at a first time;
   an evaluation unit to determine a position of the moving device specifying the position of the moving device at a time by evaluating the detected signal,
   wherein the evaluation unit is configured to determine a first position specifying the position of the moving device, at the first time;
   an error distance determination unit to determine at least one error distance, the at least one error distance specifying a distance by which the moving device moves on between the first time and a second time, the second time being after the first time; and
   a position correction unit having an output terminal to output a corrected position, the corrected position specifying the position of the moving device at the second time,
   wherein the error distance determination unit is configured to determine a velocity of the movement of the moving device and to determine the at least one error distance in dependence on the velocity of the movement of the moving device and in dependence on a delay time specifying the time duration between the first time at which the signal generated by the moving device is detected and the second time at which the corrected position is output at the output terminal of the position correction unit, and
wherein the position correction unit is configured to determine the corrected position in dependence on the at least one error distance and the first position.

2. The position sensor device as claimed in claim 1, wherein the detection unit is configured to detect a rotating magnetic field of a rotating magnet, the detection unit being configured to detect the rotating magnetic field at the first time,
wherein the evaluation unit is configured to determine a rotating angle of the rotating magnet specifying the position of the rotating magnet at the time by evaluating the detected rotating magnetic field,
wherein the evaluation unit is configured to determine a first rotating angle specifying the position of the rotating magnet at the first time,
wherein the error distance determination unit is configured to determine at least one error angle, the at least one error angle specifying an angle by which the rotating magnet turns on between the first time and the second time,
wherein the position correction unit is configured to output a corrected rotating angle, the corrected rotating angle specifying the position of the rotating magnet at the second time,
wherein the error distance determination unit is configured to determine a velocity of the rotation of the rotating magnet and to determine the at least one error angle in dependence on the velocity of the rotation of the rotating magnet and in dependence on the delay time, and
wherein the position correction unit is configured to determine the corrected rotating angle in dependence on the at least one error angle and the first rotating angle.

3. The position sensor device as claimed in claim 2, comprising:
an output terminal being coupled to the position correction unit to output the corrected rotating angle,
wherein the delay time is a propagation delay time specifying the time duration between the detection of the rotating magnetic field at the first time and the output of the corrected rotating angle at the output terminal.

4. The position sensor device as claimed in claim 2, wherein the error distance determination unit is configured to determine a first one of the at least one error angle, and
wherein the error distance determination unit is configured to determine the first error angle in dependence on the velocity of the rotation of the rotating magnet between the first time and a prior time.

5. The position sensor device as claimed in claim 4, wherein the evaluation unit is configured to evaluate the detected rotating magnetic field at the first time and the prior time,
wherein the evaluation unit is configured to determine a prior rotating angle of the rotating magnet specifying the position of the rotating magnet at the prior time, and
wherein the error distance determination unit is configured to determine the velocity of the rotation of the rotating magnet in dependence on a difference between the first rotating angle and the prior rotating angle and a difference between the first time and the prior time.

6. The position sensor device as claimed in claim 5, comprising:
an oscillator circuit to provide a clock signal for operating the evaluation unit and the error distance determination unit,
wherein the evaluation unit is configured to evaluate the detected rotating magnetic field in a time interval being dependent on the clock signal to determine the first rotating angle and the prior rotating angle.

7. The position sensor device as claimed in claim 6, wherein the evaluation unit is configured such that the time duration between the first time and the prior time is a multiple of an integer value of the time interval.

8. The position sensor device as claimed in claim 4, wherein the position correction unit is configured to determine the corrected rotating angle in dependence on a sum of the first rotating angle and the first error angle.

9. The position sensor device as claimed in claim 4, wherein the error distance determination unit is configured to determine an acceleration of the rotation of the rotating magnet and to determine a second one of the at least one error angle in dependence on the acceleration of the rotation of the rotating magnet and the delay time, and
wherein the position correction unit is configured to determine the corrected rotating angle in dependence on the second error angle.

10. The position sensor device as claimed in claim 9, wherein the position correction unit is configured to determine the corrected rotating angle in dependence on a sum of the first rotating angle and the first error angle and the second error angle.

11. The position sensor device as claimed in claim 9, wherein the error distance determination unit is configured to determine a change of the acceleration of the rotation of the rotating magnet and to determine a third one of the at least one error angle in dependence on the change of the acceleration of the rotation of the rotating magnet and the delay time, and
wherein the position correction unit is configured to determine the corrected rotating angle by adding the third error angle to the sum of the first rotating angle and the first error angle and the second error angle.

12. A method to determine a position of a moving device, comprising:
detecting a signal generated by the moving device at a first time;
determining a first position of the moving device by evaluating the detected position detected at the first time, the first position specifying the position of the moving device at the first time;
determining a velocity of the movement of the moving device;
determining at least one error distance,
wherein the at least one error distance specifies a distance by which the moving device moves on between the first time and a second time,
wherein the second time is after the first time;
determining a corrected position in dependence on the at least one error distance and the first position, the corrected position specifying the position of the moving device at the second time; and
outputting the corrected position,
wherein the at least one error distance is determined in dependence on the velocity of the movement of the moving device and a delay time, and
wherein the delay time specifies the time duration between the first time at which the signal generated by the moving device is detected and the second time at which the corrected position is output.

13. The method as claimed in claim 12, comprising:
detecting a rotating magnetic field of a rotating magnet at the first time;
determining a first rotating angle of the rotating magnet by evaluating the detected rotating magnetic field detected at the first time, the first rotating angle specifying the position of the rotating magnet at the first time;
determining a velocity of the rotation of the rotating magnet;
determining at least one error angle in dependence on the velocity of the rotation of the rotating magnet and the delay time,
wherein the at least one error angle specifies an angle by which the rotating magnet turns on between the first time and the second time; and
determining a corrected rotating angle in dependence on the at least one error angle and the first rotating angle, the corrected rotating angle specifying the position of the rotating magnet at the second time.

14. The method as claimed in claim 13, comprising:
determining a first of one the at least one error angle;
determining the first error angle in dependence on the velocity of the rotation of the rotating magnet between the first time and a prior time; and
determining the corrected rotating angle in dependence on the first rotating angle and the first error angle.

15. The method as claimed in claim 14, comprising:
determining an acceleration of the rotation of the rotating magnet;
determining a second one of the at least one error angle in dependence on the acceleration of the rotation of the rotating magnet and the delay time; and
determining the corrected rotating angle in dependence on the second error angle.

16. The method as claimed in claim 15, comprising:
determining the corrected rotating angle in dependence on a sum of the first rotating angle and the first error angle and the second error angle.

17. The method as claimed in claim 15, comprising:
determining a change of the acceleration of the rotation of the rotating magnet;
determining a third one of the at least one error angle in dependence on the change of the acceleration of the rotation of the rotating magnet and the delay time; and
determining the corrected rotating angle by adding the third error angle to the sum of the first rotating angle and the first error angle and the second error angle.

* * * * *